United States Patent [19]

Mims

[11] Patent Number: 4,771,287

[45] Date of Patent: Sep. 13, 1988

[54] METHOD OF CORRECTING FOR ERRORS IN RADAR IMAGING

[75] Inventor: James H. Mims, Millersville, Md.

[73] Assignee: Westinghouse Electric Corp., Pittsburgh, Pa.

[21] Appl. No.: 507,260

[22] Filed: Jun. 23, 1983

[51] Int. Cl.$^4$ .............................................. G01S 13/90
[52] U.S. Cl. ....................................... 342/25; 342/191
[58] Field of Search .................. 342/25, 66, 179, 191, 342/161, 63, 65, 120, 123, 194, 195, 189

[56] References Cited

U.S. PATENT DOCUMENTS

| | | | |
|---|---|---|---|
| 3,905,031 | 9/1975 | McCord | 342/25 |
| 4,034,370 | 7/1977 | Mims | 342/25 |
| 4,084,158 | 4/1978 | Slawsby | 342/25 |
| 4,134,113 | 1/1979 | Powell | 342/25 |
| 4,163,231 | 7/1979 | Zuerndorfer | 342/25 |
| 4,164,738 | 8/1979 | Swerling | 342/25 |
| 4,227,194 | 10/1980 | Herman et al. | 342/25 |
| 4,246,580 | 1/1981 | Caputi, Jr. | 342/25 |
| 4,325,065 | 4/1982 | Caputi, Jr. | 342/25 |
| 4,339,752 | 7/1982 | Williams et al. | 342/25 |
| 4,387,373 | 6/1983 | Longuemare, Jr. | 342/25 |
| 4,471,357 | 9/1984 | Wu et al. | 342/25 |
| 4,546,355 | 10/1985 | Boles | 342/179 |

Primary Examiner—Thomas H. Tarcza
Assistant Examiner—John B. Sotomayor
Attorney, Agent, or Firm—W. G. Sutcliff

[57] ABSTRACT

A method of correcting for focus errors or higher order errors, or various combinations thereof, in the final image effected by the processing of a radar. With regard to correcting focus errors, the method coherently combines the signal focus data from selected target time histories derived by a first stage processor of the radar to form a complex signal representative of the average focus error of the radar image. From the phase of the complex signal is derived a set of focus error compensation signals which are used to compensate for focus errors in the target time histories derived by the first stage processor. With regard to the higher order error correction, the method coherently combines the signal data from selected target time histories derived by the first stage processor by shifting the phase and frequency centroids of each complex signal thereof to a common value. Light filtering may be provided to remove wide band noise with a linear phase filter. Accordingly, the coherently combined and filtered error correction signals are point wise inverted and thereafter used to correct the complex signals of the time histories derived by the first stage processor. An additional embodiment is provided to permit both the focus error and higher order error correction methods to be performed at an intermediate stage in the radar processing.

12 Claims, 6 Drawing Sheets

METHOD OF CORRECTING FOR ERRORS IN RADAR IMAGING

BACKGROUND OF THE INVENTION

The present invention relates to radar imaging, in general, and more particularly, to a method of correcting for focus errors or higher order errors, or various combinations thereof, in the final image effected by the radar processing.

Radar imaging may be performed, for example, by synthetic aperture radar (SAR) processing which produces the equivalent effect of an extremely long antenna to improve the azimuth resolution (angular resolution) for high-resolution imaging, like ground mapping, for example. The extremely long antenna may be synthesized as illustrated in FIG. 1 using the forward motion of an aircraft $12'$ along a flight path $10'$ to carry a side-looking antenna $14'$, for example, to flight positions $S_1$ through $S_N$ which may be treated as individual antenna elements of a linear antenna array. Since these aircraft positions $S_1$-$S_N$ or synthesized individual antenna elements do not exist simultaneously, the radar return signals, which contain image phase information, are collected at each position $S_n$ and retained in a memory to be later combined in proper phase to collectively synthesize the desired effect of a narrow-beamed antenna.

An exemplary two-stage radar processor suitable for embodying radar imaging techniques is described in the U.S. Pat. No. 4,034,370 entitled "Second Order Motion Compensator For High Resolution Radar" issued July 5, 1977 to James H. Mims, and assigned to the same assignee as the instant application. Typically, as shown in FIG. 1, a radar may transmit a group of pulsed beams $16'$ of a predetermined number with a given pulse repetition frequency (PRF) at each aircraft position $S_n$. Each group of beams may be directed to a common swath or target field $18'$ on the ground, for ground mapping purposes. The common ground swath $18'$ may be arranged into a predetermined number of isorange contours $20'$ which divide the ground swath $18'$ into a number of range cells $R_1$ through $R_j$. Accordingly, for each aircraft position $S_n$, the radar return signals are collected and processed corresponding to their range cells in a first stage processor of the radar. More specifically, the first stage processor conventionally comprises a fast Fourier transform (FFT) processor which includes a given number of doppler filter banks, say on the order of 16 or 32, for example. Thus, for each range cell $R_j$, the first stage processor may divide the ground swath $18'$ into subbeams $A_1$ through $A_k$ in the azimuth direction commensurate in number to the number of doppler filter banks of the first stage processor, whereby the detected targets in the radar beam $16'$ may be identified by the range cell $R_j$ and doppler filter bank (subbeam) $A_k$ in which they fall.

Each range-doppler cell $(R_jA_k)$ computation of the first stage processor will result in a complex signal representation of the target corresponding to that cell. The position of a detected target within a subbeam $A_k$ may be measured as a function of its displacement in the azimuth dimension from the equivalent center of its containment filter. The function may be one of a sine wave whose frequency depends on the target displacement from the filter's center frequency. The first stage signal processor may arrange it so that the center frequency of each filter is at zero doppler. Generally, a target which is detected at random doesn't necessarily fall on a filter center line, so it may have some doppler frequency shift associated therewith. A history of complex signals for each target corresponding to the aircraft positions $S_1$ through $S_N$ is collected and retained in memory for further processing in a second stage processor. The overall observation time during which target signal history is collected is generally referred to as a radar look.

The second stage processor of the SAR is operative to increase the resolution of each azimuth subbeam of the radar ground map $18'$. For example, the ground map image after the first processor may only be divided into say 16 subbeams along the azimuth direction corresponding to the number of filter banks utilized in the FFT processing of the radar echo beam data. The radar may collect on the order of 64 time samples corresponding to the aircraft positions $S_1$ through $S_N$ for each range-subbeam cell $R_jA_k$ of the radar image map. Accordingly, the second processor operates on the time signal history (i.e. 64 time samples) of each range-subbeam cell $R_jA_k$ individually to increase the resolution thereof by as much as 32 fold for the present example. Thus, at the output of the second processor, the map image cell resolution along the azimuth direction may be increased to $32 \times 16$ or 512 final subbeams for each radar look.

There are of course, certain requirements to be maintained during the radar signal processing of each radar look. One of these requirements is that the aircraft fly at a near constant velocity in a straight line or at least within a narrowly defined corridor. Since this is not always possible, motion compensation systems are provided, such as the one described in the aforementioned reference U.S. Pat. No. 4,034,370, for example, to correct for the aircraft's deviations from that required. For high resolution SAR's, severe motion compensation requirements are imposed and some form of manual or automatic focus adjustment of the radar image generated is desirable. For example, at x-band, the on-board navigational system of one known SAR must measure flight path deviations as small as a tenth of an inch over a flight path of several hundred feet if the signal processor thereof is to produce on infocus image "open loop". Moreover, in these high quality SAR systems, it is also desirable to maintain very low sidelobe levels, say on the order of $-40$ dB, for example. This is not an easy task because unmeasured mechanical vibrations of only 0.002 inches can produce side lobes on this order. In fact, there are many sources of errors, such as propagation effects and phase and amplitude errors of RF components which may range with the environment, for example, which are also not measureable and may contribute to sidelobe levels. Errors of this variety are commonly referred to as higher order errors.

Present SAR's such as the one described in the aforementioned reference U.S. Pat. No. 4,034,370, for example, generally include a technique for focusing the radar generated image either automatically or manually. One known automatic focusing technique is based on a statistical average of phase signal time histories from selected point-like targets. The phase measurements of this technique are made at an intermediate point in the processing, generally after the first stage, where the correlation gain is high enough to provide adequate signal-to-noise ratio (SNR) for the phase calculations while having sufficient resolution to separate isolated targets from one another. The method consists of a least square error (LSE) fit to a constant frequency i.e. a quadratic phase fit, over the field of selected target signals. While this method has performed adequately in fully automatic operation with real data, it is limited to only measuring the quadratic component of phase error. Extension of this method to include compensation of the higher order errors such as periodic and random (but correlated) errors is unlikely to provide acceptable results. One reason is that the calculation of target phase signal history is presently a non-linear operation (i.e. non-coherent averaging of the complex signals or vectors) which may render $2\pi$ ambiguities in the time/signal history. This leads to spurious signal components or glitches which if applied as a correction signal may generate additional errors. Another reason for unacceptability is that amplitude errors are not compensatable by the present focus method.

In summary, the present focus error compensation method involves highly non-linear operations, requires high threshold signal-to-noise ratio levels, and exhibits phase glitches due to the $2\pi$ phase ambiguities generated in the calculation of the target phase histories. Accordingly, it would be desirable to avoid most of these problems in a focus error compensation method of a radar, but even more so, the overall compensation provisions of the radar signal processing should be extendable to correct for higher order errors which inevitably arise and cause problems in radar imaging. With the present compensation method, this is not adequately realizable.

SUMMARY OF THE INVENTION

In a radar system including at least first and second stages for processing radar echo signals over a plurality of time samples of a single radar look, the radar echo signals are conditioned at each time sampling period by deramping in doppler and compressing into a plurality of range cells. The first stage is operative to derive from the conditioned radar echo signals at each time sample a set of complex signals of point-like targets according to a coarse azimuth resolution for each range cell of the plurality to form a time history of complex signals corresponding to the plurality of time samples for each point-like target. The second stage is operative to derive from the time histories of point-like targets a final azimuth resolution thereof to form a final radar image with improved resolution from a single radar look. In accordance with the present invention, the focus of the final radar image is enhanced by correcting focus errors developed in the time signal history data derived by the first stage prior to processing in the second stage. This method for correcting focus errors comprises the steps of coherently combining the complex signals of time history selected from the time histories derived by the first stage to generate a set of correction signals corresponding to the time samples of the first stage derived time histories, and correcting the time histories derived by the first stage with respectively corresponding correction signals prior to being processed in the second stage.

Another aspect of the present invention includes a method for correcting for higher orders developed in the time signal history data derived by the first stage prior to processing in the second stage. In accordance with this method, a first subset of complex signal target time histories are selected from the time histories derived by the first stage. First and second complex signals are derived for each target time history of the first subset using the complex signals respectively corresponding thereto. The first and second complex signals are representative respectively of the average doppler frequency and average doppler phase of the corresponding target time histories. The complex signals of the selected time histories are adjusted as a function of their correspondingly derived first and second complex signals to form a second subset of frequency in-phase adjusted complex signal time histories. The complex signals of the second subset are coherently combined in accordance with common time samples of the time histories thereof to form a single time history of combined complex signals. A time history of error correction signals is generated as a function of the corresponding time samples of the combined complex signal time history and are used to correct the corresponding complex signals of the time histories derived by the first stage.

A further aspect of the present invention provides for correcting the complex signals of the time histories of the first subset with respectively corresponding focus error signals to form a second subset of focus corrected selected target time histories from which are derived first and second complex signals which are representative respectively of the average doppler frequency and average doppler phase of their corresponding target time histories. The time histories of the second subset are adjusted as a function of their correspondingly derived first and second complex signals to form a third subset of frequency and phase adjusted complex signal time histories, the complex signals thereof being coherently combined in accordance with common time samples to form a single time history of combined complex signals. Thereafter, a time history of high order error correction signals are generated as a function of the corresponding time samples of the combined complex signal time history. Accordingly, the complex signals of the time histories derived by the first stage are corrected with corresponding signals of both of the focus error and higher order error correction signal time histories.

DESCRIPTION OF THE PREFERRED EMBODIMENTS

Figure 2:
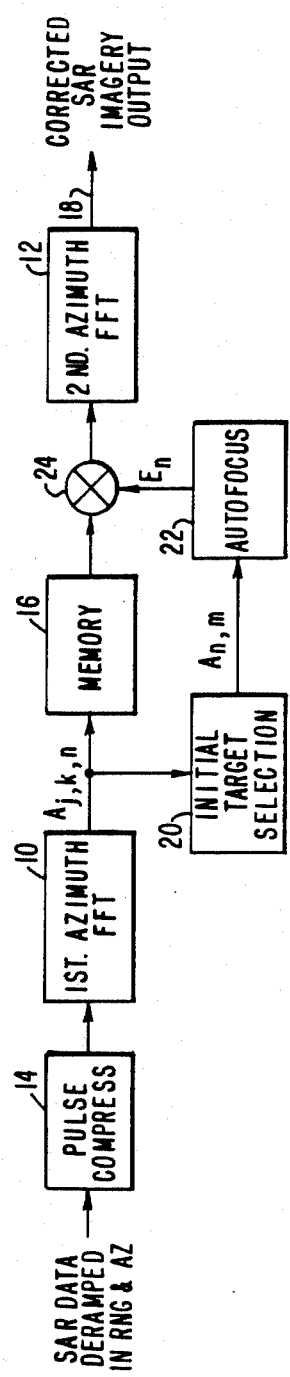
FIG. 2 is a simplified block diagram schematic of a portion of a radar suitable for embodying the autofocus method aspect of the present invention.

A radar suitable for embodying the various aspects of the present invention is disclosed in the previously referenced U.S. Pat. No. 4,034,370 which is incorporated by reference in the instant application for providing a more detailed description of such a radar. FIG. 2 is a simplified block diagram schematic of a portion of a similar radar embodying an autofocus technique. This embodiment includes at least first and second stages 10 and 12, respectively, for processing radar echo signals over a plurality of time samples of a single radar look. The processors 10 and 12 may be of the fast Fourier transform type (FFT). The radar echo signal format provided to the first FFT processor 10 may be deramped in doppler and fully compressed into a plurality of range cells wherein the signal from a target displaced in azimuth from a given reference point exhibits a nominally constant doppler frequency proportional to the displacement. This particular format may hold for all of the SAR modes of operation including the well-known strip, scan and spot mapping geometries.

Figure 1:
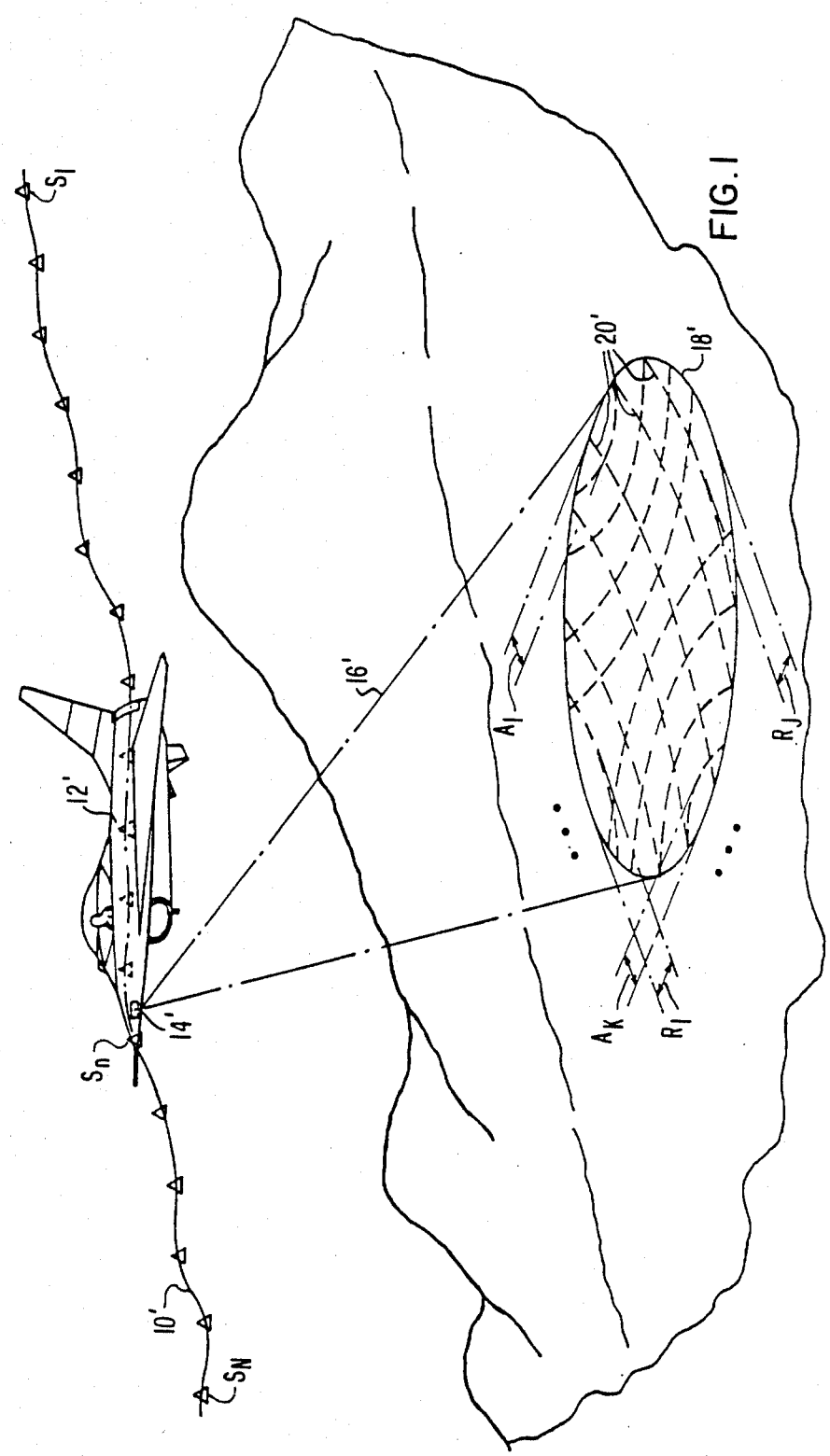
FIG. 1 is an illustration of the radar imaging operation of a radar carried by a forward moving aircraft.

The conditioned radar echo signals for each time sampling or flight position (as shown in FIG. 1) is provided to the first stage FFT 10. The first stage FFT derives from the conditioned radar echo signals at each time sample n a set of complex signals of point-like targets $A_{j,k}$ according to a coarse azimuth resolution for each range cell j of the plurality to form a time history of complex signals for each point-like target, denoted by $A_{j,k,n}$. For example, the time history data from a selected target m of the set may consist typically of say 64 complex samples $A_{n,m}$ which for the present example may be referred to as a data vector A. These time samples represent all the return signals from a subbeam ground patch having the dimension of one range cell j by perhaps 32 or more azimuth final resolution cells in width. Generally the time sample histories derived in the first stage FFT 10 are stored in a memory 16 in an easily accessible format for subsequent processing in the second stage FFT 12. The second stage 12 derives from the time histories of each point-like target the final azimuth resolution cells thereof to form a final radar image with improved resolution from a single radar look at the output 18 thereof.

In accordance with one aspect of the present invention, a method of enhancing the focus of the final radar image may be included in the previously described embodiment of FIG. 2 and may be operative by measuring and correcting focus errors developed in the time signal history data derived by the first stage 10 prior to processing in the second stage 12. The focusing method may be performed in the cascaded functional blocks 20 and 22 provided between the first stage processor 10 and a conventional multiplier unit 24 disposed between the memory 16 and second stage FFT processor 12. The target signals $A_{j,k,n}$ derived by the first stage processor 10 may be provided to the functional block 20 for target signal selection. Selected target signal time histories are denoted by $A_{n,m}$ where n refers to the nth complex signal of the time history or data vector A and m refers to the mth target of the set $A_{j,k,n}$. The target signal selection process of block 20 may be carried out simultaneously with the memory filling operations of memory 16. One technique for target selection is comparing the amplitude of the complex signals $A_{j,k,n}$ of derived by the processor 10 to a prederived reference amplitude which may be preset or adaptively calculated. Ordinarily, only about 50–100 target signal time histories are selected from a possible 20,000 to 50,000 data sets. Accordingly, the selected target histories $A_{n,m}$ are provided to the autofocus functional block 22 which measures the focus error thereof and generates a set of compensating focus errors $E_n$ for compensating the respectively corresponding complex signals $A_n$ of the time histories of the memory 16 using the multiplier unit 24 prior to being processed by the second stage FFT 12.

Figure 3:
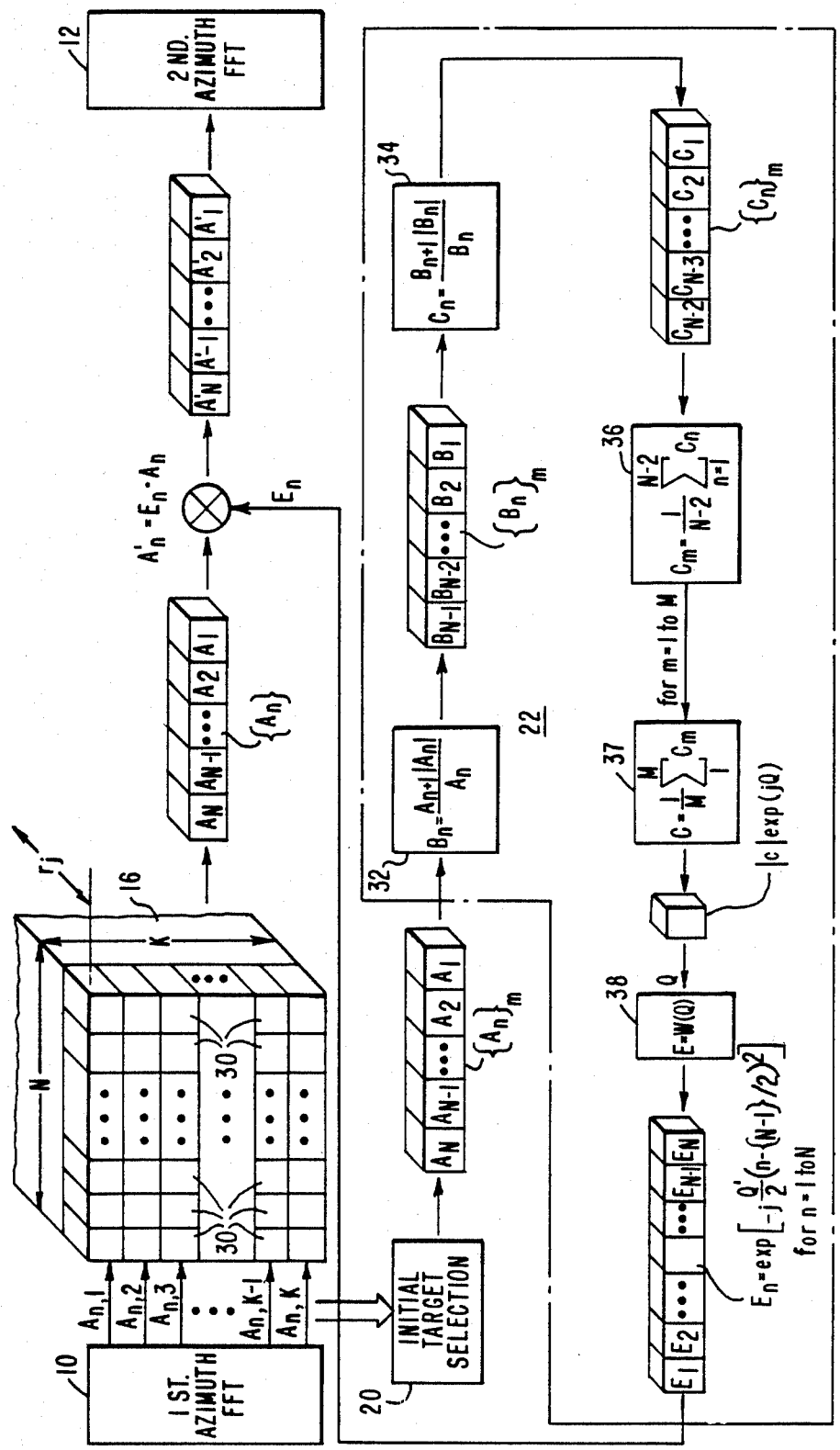
FIG. 3 is a functional diagram illustrating the functions performed by an exemplary autofocus functional block suitable for use in the embodiment of FIG. 2.

A suitable embodiment for illustrating the functions performed by an exemplary autofocus functional block 22 is depicted in FIG. 3. A set of complex signals $A_{j,k}$ corresponding to each point-like target of the ground map are derived by the first stage FFT 10 for each time sample n. This process continues for accumulating the time histories of the $A_{j,k}$ point-like targets each having a time history of N complex signals associated therewith. The time histories $A_{j,k,n}$ may be accumulated in the memory 16 in storage cells 30 in a time history format 1 through N for each range cell $r_j$ and be simultaneously provided to the initial target selection functional block 20 for the selection of a subset of target time histories, $A_{n,m}$, for m=1 to M.

The complex signals $A_n$ of a selected time history m may be combined in the functional block 32 of the autofocus functional block 22 to form a first set of complex signals $B_n$ which are a measure of the instantaneous doppler frequencies of the corresponding time history data samples $A_n$ of the selected target. More specifically, the complex signals $A_n$ may be combined in block 32 in accordance with the following mathematical expression:

$$B_n = \frac{A_{n+1} |A_n|}{A_n} \text{ for } n = 1 \text{ to } N, \quad (1)$$

where $A_n$ and $A_{n+1}$ denote consecutive complex signal samples of the time history of the selected target, N denotes the total number of time samples therein, and $B_n$ denotes a complex signal of the first set.

In the next functional block 34, the complex signals $B_n$ may be combined to form a second set of complex signals $C_n$ which are a measure of the instantaneous doppler frequency slopes of the corresponding time history data samples $A_n$. More specifically, the complex signals $B_n$ may be combined in accordance with the following mathematical expression.

$$C_n = \frac{B_{n+1} |B_n|}{B_n} \text{ for } n = 1 \text{ to } N - 1, \quad (2)$$

where $B_n$ and $B_{n+1}$ denote consecutive complex signal samples of the first set, and $C_n$ denotes a complex signal of the second set. The complex signals $C_n$ of the second set may be thereafter averaged in functional block 36 to form a third complex signal $C_n$ which is a measure of the focus error corresponding to the mth selected target.

The focus errors $C_m$ corresponding to all of the selected targets m=1 through M may be derived in a similar manner as described above and averaged in functional block 37 to form a fourth complex signal C which is a measure of the average focus error of all of the selected target time histories $A_{n,m}$. The derived fourth complex signal includes both a magnitude $|C|$ and a phase Q. The preceding functional steps may be summarized as coherently combining the complex signals $A_n$ of the time history of selected point-like targets m to measure the average focus error thereof. Accordingly, the remaining processing steps of block 22, include correcting the time history of complex signals $A_n$ of the target time signal histories of memory 16 in accordance with the focus error measured therefrom. More specifically, in functional block 38 of the autofocus functional block 22, a set of unit vectors $E_n$ are formed from a weighted function of the phase angle Q of the fourth complex signal C. These weighted unit vectors $E_n$ may be formed in accordance with the following mathematical expression:

$$E_n = \exp\left[-j\frac{Q}{2}(n - \{N - 1\}/2)^2\right] \text{ for } n = 1 \text{ to } N. \quad (3)$$

Finally, each complex signal $A_n$ of the time histories stored in memory 16 may be corrected utilizing the conventional multiplier unit 24 with a corresponding weighted unit vector $E_n$ from the formed set thereof resulting in a focus error compensated type history of complex signals $A'_n$ for processing by the second stage FFT 12.

It is understood that additional refinements may be made to this autofocus compensation process without deviating from the broad inventive principles thereof. For example, in the target selection process step, a number of complex signals of a target history may be omitted from the coherent summations of functional blocks 32, 34 and 36 based on a low amplitude accept/reject criteria. Furthermore, those target time histories having an excessive number of low amplitude frequency samples may be rejected entirely. Another criterion for target rejection which may be considered is the following test:

$$|C| < q\text{SUM}(|C_n|)/N \text{ over } n = 1, 2 \ldots N \text{ for } 0. < q < 1. \quad (4)$$

Another refinement for consideration may be the alternate approach for signal combining during the processing steps of blocks 32 and 34 in which the geometric mean of the consecutive amplitudes may be formed in accordance with the following expression:

$$B_n = \frac{A_{n+1} |A_n|^{1.5}}{A_n |A_{n+1}|^{0.5}} = \sqrt{|A_n| |A_{n+1}|} \exp(jQ'). \quad (5)$$

However, the square root calculations are generally more costly in processing mechanization.

In summary, the method of measuring and correcting unknown focus errors in coherent electromagnetic systems including radar or pulse compression systems and synthetic aperture radar systems may be based on measurements of conditioned radar echo signal data at an intermediate stage of processing, more particularly after the first stage of a two stage FFT processing mechanization. In addition, the focus error measuring steps have the advantages of being linear, improving the signal to noise ratio (SNR) of the measurements by use of coherent integration of the complex signal samples of the target time history individually, avoiding the modulo $2\pi$ glitch problems, and weighting the signal samples in accordance with the quality of radar signal information content. Moreover, the method steps of coherently combining the signal focus data from widely separated (i.e. selected) targets by the derivation of higher order coherent phase derivative vectors $B_n$ and $C_n$ of the complex signal time samples from each target time history of the selected subset and the formation of the complex signals $C_m$ therefrom. And, thereafter, averaging the signals $C_m$ to form the complex signal C representative of the average focus error of the radar image. The method continues by deriving a set of focus error compensation signals $E_n$ based on a weighted function of the phase Q of the signal C. The method additionally provides for the point-wise application of the derived focus error correction signals $E_n$ to the respectively corresponding complex signals $A_n$ in the multiplication unit 24 prior to the last stage of FFT processing in the unit 12.

Figure 4:
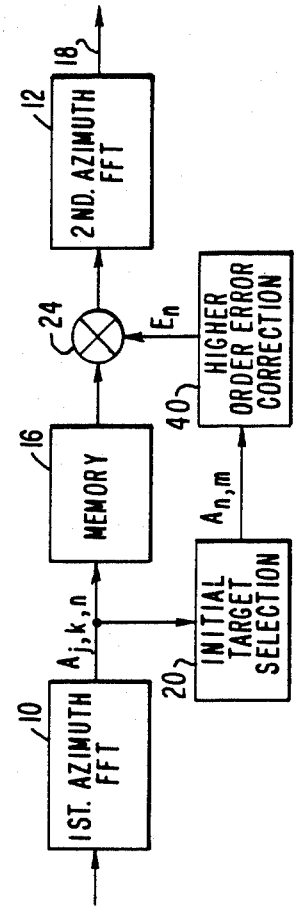
FIG. 4 is a simplified block diagram schematic of a portion of a radar suitable for embodying the higher order error correction apsect of the present invention.

Another aspect of the present invention includes a method of improving the final radar image as output by the second stage FFT 12 by measuring and correcting for higher order errors developed in the time signal history data derived by the first stage 10 prior to processing in the second stage 12. A simplified block diagram schematic of a portion of a synthetic aperature radar suitable for embodying this aspect of the present invention is shown in FIG. 4. The functional block diagram of FIG. 4 is similar to the embodiment described in connection with FIG. 2 with the exception that a higher order error correction functional block 40 is substituted for the autofocus functional block 22. An initial target selection process is undertaken in the functional block 20 in a similar manner as that described for the embodiment of FIG. 2 resulting in the selection of a first subset of point-like targets n and the complex signal time histories $A_{n,m}$ associated therewith. The higher order error correction block 40 derives a time history of higher order error correction signals $E_n$ which are used to compensate corresponding complex signals $A_n$ in the multiplication unit 24 for all of the time histories of the point-like targets stored in the memory 16.

Figure 5A:
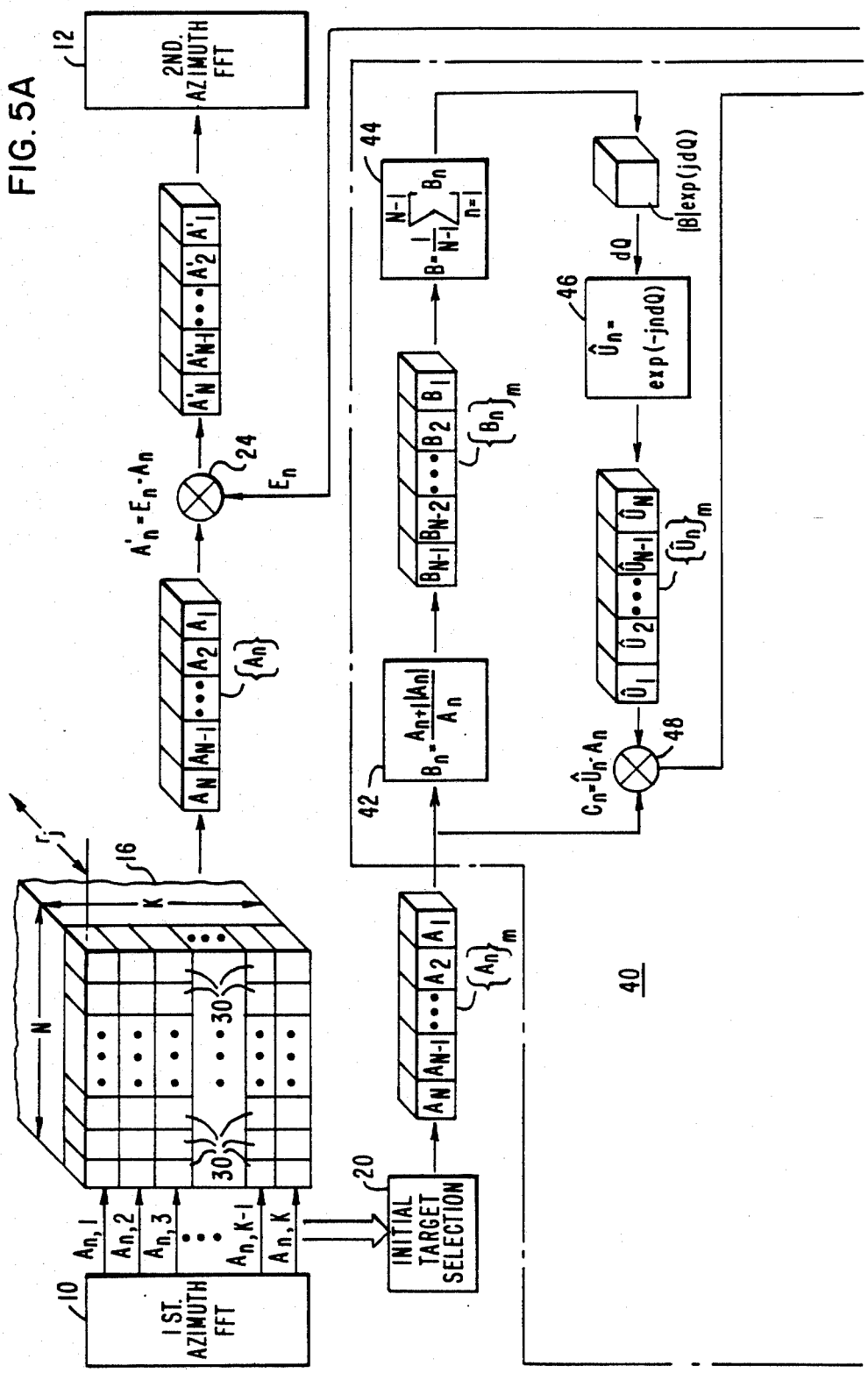
FIGS. 5A and 5B combined provide a functional diagram illustrating the functions performed by a higher order error correction functional block suitable for use in the embodiment of FIG. 4.
Figure 5B:
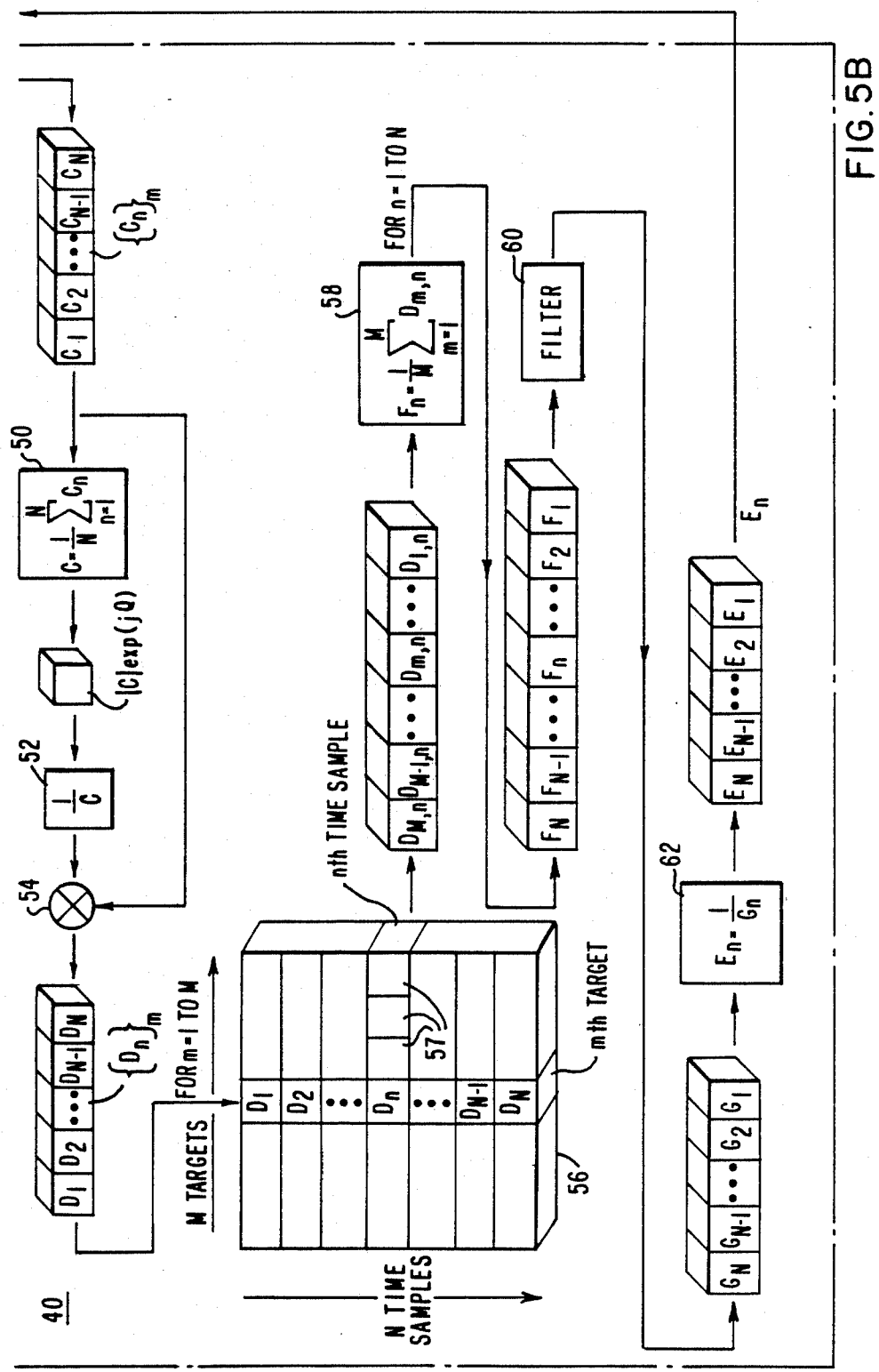

A suitable embodiment of the higher order error correction functional block 40 is shown in greater detail in the combination of FIGS. 5A and 5B. Referring to FIGS. 5A and 5B, the complex signal time history $\{A_n\}$ is representative of a selected time history of the first subset provided by the functional block 20. In accordance with the broad principles of this aspect of the present invention, first and second complex signals B and C, respectively, are derived for each target time history m=1 to M of the first subset from the complex signals $A_n$ respectively corresponding thereto. The first and second complex signals B and C are representative respectively of the average doppler frequency and average doppler phase of their corresponding target time histories. The complex signals $A_n$ of the selected time histories are adjusted as a function of their correspondingly derived first and second complex signals to form a second subset of frequency and phase adjusted complex signal time histories $\{D_n\}$. The complex signals $D_n$ of the second subset are coherently combined in accordance with common time samples n of the time histories N thereof to form a single time history $F_n$ of combined complex signals. Thereafter, a time history of error correction signals $E_n$ may be generated as a function of the corresponding time samples $F_n$. Accordingly, the complex signals $A_n$ of the time histories of the memory 16 may be corrected utilizing the multiplication unit 24 with corresponding time samples $E_n$ of the derived time history of error correction signals.

More specifically, the complex signals $A_n$ of the time history of a selected target m may be combined in the functional blocks of 42 and 44 to derive a first complex signal B representative of the average doppler frequency corresponding to the selected target. Preferably, in functional block 42, the complex signals $A_n$ of the time history of N complex signals of the selected target may be combined to form a second time history of complex signals $B_n$ in accordance with the following expression:

$$B_n = \frac{A_{n+1} |A_n|}{A_n} \text{ for } n = 1 \text{ to } N - 1, \quad (6)$$

where $A_n$ and $A_{n+1}$ denote consecutive complex signal samples of the time history. In addition, in the derivation of the first complex signal B in functional block 44, it is preferred that the complex signals $B_n$ be averaged in accordance with the following expression:

$$B = \frac{1}{N-1} \sum_{n=1}^{N-1} B_n \quad (7)$$

The first complex signal B includes both a magnitude |B| and a phase dQ. In functional block 46, a weighted time history of complex signals EXP (−jndQ) may be formed for n=1 to N from the phase dQ of the first complex signal B. Thereafter, the complex signals $A_n$ may be adjusted in a conventional multiplication unit 48 with their corresponding complex signals EXP (−jndQ) for n=1 to N to form a time history of N frequency adjusted complex signals $C_n$. In addition, the frequency adjusted complex signals $C_n$ may be averaged in the functional block 50 to derive the second complex signal C which is representative of the average doppler phase corresponding to the selected target. Thereafter, the second complex signal C may be inverted in the functional block 52 and the inverted signal may be used to adjust the frequency adjusted complex signals $C_n$ in the multiplication unit 54 to form a corresponding time history of frequency and phase adjusted complex signals $D_n$. The processing steps of the functional blocks of 42, 44, 46, 48, 50, 52 and 54 previously described may be repeated for each target m=1 to M of the first subset to form a second subset of frequency and phase adjusted complex signal target time histories which may be stored in a temporary memory such as that depicted at 56.

The cells 57 of the memory 56 may be filled with the N complex signal values $D_n$ of the M targets of the second subset. The stored complex signals $D_{n,m}$ corresponding to a common time sample n may be accessed from the memory 56 for coherent averaging in the functional block 58. This procedure is repeated for all of the time samples n=1 to N to form a single time history of averaged complex signals $F_n$. In the generation of the time history of error correction signals $E_n$, it is preferred that the time history of average complex signals $F_n$ be filtered in the functional block 60 to form a corresponding time history of filtered complex signals $G_n$ which are thereafter inverted (conjugated) in the functional block 62 to form a corresponding time history of error correction signals $E_n$. Thus, the complex signals $A_n$ of the time histories in memory 16 may be corrected with the corresponding error correction signals $E_n$ in the multiplication unit 24 to form a time history of complex signals $A'_n$ corrected for higher order errors.

Moreover, the step of filtering which may be conducted in the functional block 60 may include the steps of filtering the time history of averaged complex signals $F_n$ with a K point filter to form the corresponding time history of N filtered complex signals $G_n$ in accordance with the following mathematical expressions:

$$G_n = \begin{cases} \sum_{k=1}^{K} (H_{k,n} \cdot F_k) \text{ for } n = 1,2,\ldots \left[\frac{K+1}{2}\right] \\ \sum_{k=1}^{K} \left(H_{k,[\frac{K+1}{2}]} \cdot F_{n-[\frac{K+1}{2}]+k}\right) \text{ for } n = \\ \left[\frac{K+1}{2}\right]+1, \left[\frac{K+1}{2}\right]+2,\ldots, \\ N - [K/2] - 1 \\ \sum_{k=1}^{K} (H_{k,K-N+n} F_{N-K+k}) \text{ for } n = \\ N - [K/2], N - [K/2] + 1, \ldots, N \end{cases} \quad (8)$$

where $H_{k,j}$ denotes the kth filter weight of the j filter weight set, and [K/2] denotes the integer part of K/2.

In summary, described hereabove is a method of measuring and correcting unknown periodic and/or random amplitude and phase errors in coherent electromagnetic systems including radar pulse compression and synthetic aperture radar systems, for example, based on measurements of processed signal data at an intermediate stage of processing, especially with regard to a two stage FFT processing procedure. This higher order error correction method includes many of the same advantages as that of the focus error correction method described hereabove including the advantages of linearity, improvement of SNR on the measurement by use of coherent integration of the complex signal samples of each target individually, avoiding the modulo $2\pi$ glitch problems, and weighting the complex signal samples in accordance with the quality of information content. The above described method for correcting higher order errors includes coherently combining the signal data from widely separated (i.e. selected) targets by shifting the phase and frequency centroid of each target signal to a common value, normalizing the amplitude of each target signal by a determined procedure, and point wise summing corresponding time history samples of each target. Light filtering may be provided to remove wideband noise with a linear phase filter so as to provide as many filtered output samples as there are time samples in each target time history to be corrected. Accordingly, the coherently combined and filtered error correction signals are point wise inverted and applied by point wise multiplication to their corresponding complex signals of the target time histories prior to being processing in the second stage of FFT processing.

Figure 6:
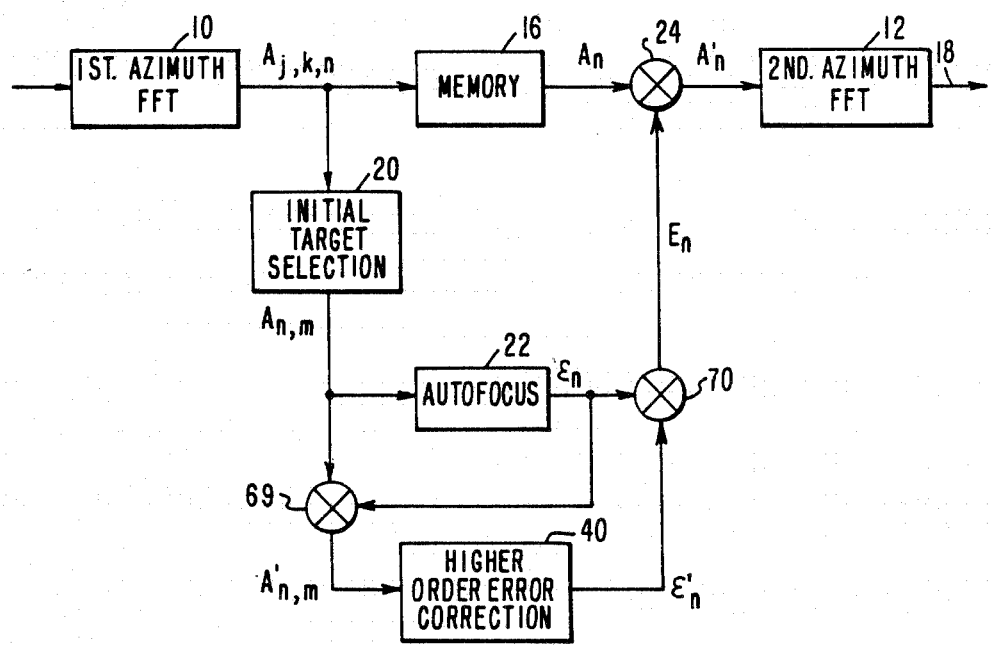
FIG. 6 is a simplified block diagram schematic or a portion of a radar suitable for embodying both the autofocus and the higher order error correction aspects of the present invention.

In accordance with another aspect of the present invention, a method of improving the final radar image by correcting for both the focus errors and higher order errors developed in the time signal history data derived by the first stage FFT 10 prior to processing in the second stage 12 may be provided according to the embodiment exemplified by the functional block diagram radar portions depicted in FIG. 6. In the embodiment of FIG. 6, a first subset of point-like targets and the complex signal time histories $A_{n,m}$ associated therewith may be selected from the complex signals $A_{j,k,n}$. The autofocus functional block 22 may function in a similar manner as that described in connection with the functional block 22 as depicted in FIG. 3 to generate a set of focus correction error signals $E_n$ corresponding to the time samples of the selected time histories. Accordingly, the complex signals of the time histories of the first subset are corrected in the multiplier unit 69 with respectively corresponding focus correction signals $\epsilon_n$ to form a second subset of focus corrected selected target time histories $A'_{n,m}$. Subsequently, the higher order error correction function of block 40 may operate in a similar manner as that described in connection with the functional block 40 of FIG. 5 utilizing the focus corrected selected target time histories $A'_{n,m}$ to generate a time history of higher order error correction signals $\epsilon'_n$. The focus error correction signals $\epsilon_n$ may be combined with corresponding ones of the higher order error correction signals $\epsilon'_n$ in the multiplier unit 70 to form a time history of combined error signals $E_n$ which may be used to correct the corresponding complex signals $A_n$ of the time histories stored in the memory 16 using the multiplication unit 24 to form focus error and higher order error corrected time histories $A'_n$.

I claim:

1. In a radar system including at least first and second stages for processing radar echo signals over a plurality of time samples of a single radar look, said radar echo signals being conditioned at each time sampling period by deramping in doppler and compressing into a plurality of range cells, said first stage for deriving from said conditioned radar echo signals at each time sample a set of complex signals of point-like targets according to a coarse azimuth resolution for each range cell of said plurality to form a time history of complex signals corresponding to said plurality of time samples for each point-like target, said second stage for deriving from said time histories of point-like targets a final azimuth resolution thereof to form a final radar image with improved resolution from a single radar look, a method of enhancing the focus of said final radar image by correcting focus errors developed in said time signal history data derived by said first stage prior to processing in said second stage, said method comprising the steps of:
coherently combining the complex signals of time histories selected from the time histories derived by said first stage to generate a set of correction signals corresponding to said time samples of said first stage derived time histories; and
correcting the time histories derived by said first stage with respectively corresponding correction signals of said set prior to being processed in said second stage.

2. The method in accordance with claim 1 wherein the step of coherently combining includes the steps of:
(a) combining the complex signal of a selected time history to form a first set of complex signals which are a measure of the instantaneous doppler frequencies of the corresponding time history data samples;
(b) combining the complex signals of said first set to form a second set of complex signals which are a measure of the instantaneous doppler frequency slopes of the corresponding time history data samples; and
(c) averaging the complex signals of said second set to form a third complex signal;
repeating steps (a) through (c) to form a third complex signal for each selected time history of complex signals; and
averaging said third complex signals to form a fourth complex signal; and wherein the step of correcting each complex signal of the selected target time history includes the steps of:
forming a set of weighted unit vectors from said fourth complex signal; and
correcting each complex signal of the time histories derived by said first stage with its respectively corresponding weighted unit vector from said formed set.

3. The method in accordance with claim 1 wherein the step of coherently combining includes the steps of:
combining the complex signals of the time history of a selected point-like target of the set to form a first set of complex signals in accordance with the following expression:

$$B_n = \frac{A_{n+1} |A_n|}{A_n} \text{ for } n = 1 \text{ to } N - 1,$$

where $A_n$ and $A_{n+1}$ denote consecutive complex signal samples of the time history of the selected target, N denotes the total number of time samples, and $B_n$ denotes a complex signal of the first set;
combining the complex signal $B_n$ of the first set to form a second set of complex signals in accordance with the following expression:

$$C_n = \frac{B_{n+1} |B_n|}{B_n} \text{ for } n = 1 \text{ to } N - 2,$$

where $B_n$ and $B_{n+1}$ denote consecutive complex signal samples of the first set, and $C_n$ denotes a complex signal of the second set; and
averaging the complex signal $C_n$ of said second set to form a complex signal $C_m$ representative of the measured focus error corresponding to the selected target m in accordance with the following expression:

$$C_m = \frac{1}{N-2} \sum_{n=1}^{N-2} C_n$$

4. The method in accordance with claim 1 wherein the step of coherently combining includes the step of forming a complex signal, $C = |C| \exp(jQ'')$, representative of the measured focus error; and wherein the step of correcting each complex signal of the target time histories includes the steps of:
forming a set of weighted unit vectors $\hat{C}_n$ from the phase angle $Q''$ of said formed complex signal C in accordance with the following expression:

$$\hat{C}_n = \exp\left[\frac{-jQ''}{2}(n - [N-1]/2)^2\right]$$

for n=1 to N; and
correcting each complex signal $A_n$ of the time histories of complex signals N with its corresponding weighted unit vector $C_n$ from said formed set in accordance with the following expression:

$$A'_n = A_n \cdot \hat{C}_n \text{ for } n = 1 \text{ to } N,$$

where $A'_n$ denotes the focus error corrected complex signal of a time history.

5. In a radar system including at least first and second stages for processing radar echo signals over a plurality of time samples of a single radar look, said radar echo signals being conditioned at each time sampling period by deramping in doppler and compressing into a plurality of range cells, said first stage for deriving from said conditioned radar echo signals at each time sample a corresponding set of complex signals of point-like targets according to a coarse azimuth resolution for each range cell of said plurality to form a time history of complex signals, corresponding to said plurality of time samples, for each point-like target, said second stage for deriving from said time histories of point-like targets a final azimuth resolution thereof to form a final radar image with improved resolution from a single radar look, a method of improving the final radar image by correcting for higher order errors developed in said time signal history data derived by said first stage prior to processing in said second stage, said method comprising the steps of:
selecting a first subset of complex signal target time histories from said time histories derived by said first stage;
deriving first and second complex signals for each target time history of said first subset using the complex signals respectively corresponding thereto, said first and second complex signals being representative respectively of the average doppler frequency and average doppler phase of their corresponding target time histories;
adjusting the complex signals of said selected time histories as a function of their correspondingly derived first and second complex signals to form a second subset of frequency and phase adjusted complex signal time histories;
coherently combining the complex signals of said second subset in accordance with common time samples of the time histories thereof to form a single time history of combined complex signals;
generating a time history of error correction signals as a function of the corresponding time samples of said combined complex signal time history; and
correcting the complex signals of the time histories derived by said first stage with corresponding signals of said derived time history of error correction signals.

6. The method in accordance with claim 5 wherein the steps of deriving and adjusting include the steps of:
(a) combining the complex signals of the time history of a selected target to derive a first complex signal representative of the average doppler frequency corresponding to said selected target;
(b) adjusting the complex signals of the selected time history as a function of said derived first complex signal associated therewith to form a corresponding time history of frequency adjusted complex signals;
(c) averaging the frequency adjusted complex signals of the time history of said selected target to derive a second complex signal representative of the average doppler phase corresponding to said selected target;
(d) adjusting the frequency adjusted complex signals of the selected time history as a function of said derived second complex signal associated therewith to form a corresponding time history of frequency and phase adjusted complex signals; and
(e) repeating steps (a) through (d) for each target of said first subset to from a second subset of frequency and phase adjusted complex signal target time histories.

7. The method in accordance with claim 6 wherein step (a) includes the steps of:
combining the complex signals $A_n$ of the time history of N complex signals of a selected target to form a second time history of complex signals $B_n$ in accordance with the following expression:

$$B_n = \frac{A_{n+1} |A_n|}{A_n} \text{ for } n = 1 \text{ to } N - 1,$$

where $A_n$ and $A_{n+1}$ denote consecutive complex signal samples of the time history; and
averaging the complex signals $B_n$ of the second time history to derive the first complex signal B in accordance with the following expression:

$$B = \frac{1}{N-1} \sum_{n=1}^{N-1} B_n = |B| \exp(jdQ),$$

wherein step (b) includes the steps of:
forming a weighted time history of complex signals $\exp(-jndQ)$ for $n=1$ to N from the normalized conjugated first complex signal B; and
adjusting the complex signals $A_n$ with their corresponding complex signal $\exp(-jndQ)$ for $n=1$ to N to form a time history of N frequency adjusted complex signals $C_n$;
wherein step (c) includes the steps of:
averaging the complex signals $C_n$ to derive the second complex signal C in accordance with the following expression:

$$C = \frac{1}{N} \sum_{n=1}^{N} C_n = |C| \exp(jQ), \text{ and}$$

wherein step (d) includes the steps of:
adjusting the complex signals $C_n$ with the inverted (conjugate) of the second complex signal C to form a time history of N frequency and phase adjusted complex signals $D_n$.

8. The method in accordance with claim 5 wherein the step of coherently combining includes the step of coherently averaging the complex signals of the second subset corresponding to a common time sample for each time sample of the time histories thereof to form a single time history of averaged complex signals.

9. The method in accordance with claim 8 wherein the step of coherently combining includes the step of coherently averaging the complex signals $D_n$ of the M selected targets of the second subset at a common time sample n for each time sample from 1 to N to form a single time history of averaged complex signals $F_n$ in accordance with the following expression:

$$F_n = \frac{1}{M} \sum_{m=1}^{M} D_{m,n} \text{ for } n = 1 \text{ to } N.$$

10. The method in accordance with claim 5 wherein the steps of generating and correcting includes the steps of:

filtering the time history of averaged complex signals to form a corresponding time history of filtered complex signals;

inverting the filtered complex signals to form a corresponding time history of error correction signals; and correcting the complex signals of the time histories derived by the first stage with the corresponding error correction signals of the inverted time history.

11. The method in accordance with claim 10 wherein the step of filtering includes the step of filtering the time history of averaged complex signals $F_n$ with a K point filter to form a corresponding time history of N filtered complex signals $G_n$ in accordance with the following expressions:

$$G_n = \sum_{k=1}^{K} H_{k,n} \cdot F_k \text{ for } n = 1 \text{ to } \left[\frac{K+1}{2}\right];$$

$$G_n = \sum_{k=1}^{K} \left( H_{k,[\frac{K+1}{2}]} \cdot F_{n-[\frac{K+1}{2}]+k} \right)$$

for $n = \left[\frac{K+1}{2}\right] + 1, \left[\frac{K+1}{2}\right] + 2, \ldots, N - \left[\frac{K}{2}\right] - 1;$ and $$G_n = \sum_{k=1}^{K} (H_{k,K-N+n} \cdot F_{N-K-k})$$

for $n = N - \left[\frac{K}{2}\right], N - \left[\frac{K}{2}\right] + 1, \ldots, N,$ where $H_{k,j}$ denotes the kth filter weight of the jth filter weight set, and $[K/2]$ denotes the integer part of $[K/2]$.

12. In a radar system including at least first and second stages for processing radar echo signals over a plurality of time samples of a single radar look, said radar echo signals being conditioned at each time sampling period by deramping in doppler and compressing into a plurality of range cells, said first stage for deriving from said conditional radar echo signals at each time sample a corresponding set of complex signals of point-like targets according to a coarse azimuth resolution for each range cell of said plurality to form a time history of complex signals, corresponding to said plurality of time samples, for each point-like target, said second stage for deriving from said time histories of point-like targets a final azimuth resolution thereof to form a final radar image with improved resolution from a single radar look, a method of improving the final radar image by measuring and correcting for focus and higher order errors developed in said time signal history data derived by said first stage prior to processing in said second stage, said method comprising the steps of:

selecting a first subset of complex signal target time histories from said time histories derived by said first stage;

coherently combining the complex signals of a time history of said first subset for each time history thereof to generate a set of focus correction signals corresponding to the time samples of said selected time histories;

correcting the complex signals of the time histories of said first subset with respectively corresponding focus correction signals of said set to form a second subset of focus corrected selected target time histories;

deriving first and second complex signals for each target time history of said second subset using the complex signals respectively corresponding thereto, said first and second signals being representative respectively of the average doppler frequency and average doppler phase of their corresponding target time histories;

adjusting the complex signals of the time histories of said second subset as a function of their correspondingly derived first and second complex signals to form a third subset of frequency and phase adjusted complex signal time histories;

coherently combining the complex signals of said third subset in accordance with common time samples of the time histories thereof to form a single time history of combined complex signals;

generating a time history of higher order error correction signals as a function of the corresponding time samples of said combined complex signal time history; and correcting the complex signals of the time histories derived by said first stage with corresponding signals of both of said focus error and higher order error correction signal time histories.

* * * * *